(12) United States Patent
Franke

(10) Patent No.: US 7,348,684 B2
(45) Date of Patent: Mar. 25, 2008

(54) DRIVE UNIT

(75) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/194,549

(22) Filed: Aug. 2, 2005

(65) Prior Publication Data

US 2006/0028024 A1 Feb. 9, 2006

(30) Foreign Application Priority Data

Aug. 3, 2004 (DE) ............... 10 2004 037 584

(51) Int. Cl.
*B60K 6/04* (2006.01)
*H02P 6/00* (2006.01)

(52) U.S. Cl. .................................. 290/40 C

(58) Field of Classification Search ............... 361/523, 361/528–529, 532, 533, 540
See application file for complete search history.

(56) References Cited

U.S. PATENT DOCUMENTS

| | | | | |
|---|---|---|---|---|
| 4,731,571 A | * | 3/1988 | Donley | 318/702 |
| 4,748,387 A | * | 5/1988 | Tanuma et al. | 318/254 |
| 4,814,677 A | * | 3/1989 | Plunkett | 318/254 |
| 5,537,020 A | * | 7/1996 | Couture et al. | 318/720 |
| 5,541,488 A | * | 7/1996 | Bansal et al. | 318/801 |
| 6,109,237 A | | 8/2000 | Pels et al. | |
| 6,201,367 B1 | * | 3/2001 | Nilson | 318/705 |
| 6,433,503 B1 | * | 8/2002 | Uematsu et al. | 318/700 |
| 6,705,416 B1 | * | 3/2004 | Glonner et al. | 180/65.2 |
| 2005/0248306 A1 | * | 11/2005 | Chen et al. | 318/712 |

FOREIGN PATENT DOCUMENTS

| | | |
|---|---|---|
| DE | 44 07 390 A1 | 9/1995 |
| DE | 197 04 153 A1 | 8/1998 |
| DE | 19917665 | 10/2000 |
| EP | 0254537 | 1/1988 |
| EP | 400455 A1 * | 12/1990 |
| EP | 510582 A2 * | 10/1992 |
| EP | 833434 A1 * | 4/1998 |
| EP | 889580 A2 * | 1/1999 |
| EP | 965475 A2 * | 12/1999 |
| GB | 2047993 A * | 12/1980 |
| WO | WO9806167 A1 * | 2/1998 |

OTHER PUBLICATIONS

Thomas M. Jahns et al., "Initial Rotor Position Estimation for an Integrated Starter Alternator IPM Synchronous Machine", EPE Conference Proceedings 2003, Topic 07d, pp. 1-9, ISBN: 90-75815-07-7.
German Office Action dated Apr. 13, 2005 with English translation.
German Office Action dated Apr. 10, 2007 with English translation (Five (5) pages).

* cited by examiner

*Primary Examiner*—Joseph Waks
(74) *Attorney, Agent, or Firm*—Crowell & Moring LLP

(57) ABSTRACT

A drive unit is provided including a synchronous machine, a pulse counter unit for detecting a rotor position during the running operation of the synchronous machine, and a control unit. The control unit is constructed such that, with the start of the operation of the synchronous machine, the stator winding of the synchronous machine is energized such that the rotor aligns itself corresponding to a magnetic preference direction parallel to the direction of the magnetic stator field generated by the energizing. In addition, the pulse counter unit is set to a defined starting value.

9 Claims, 2 Drawing Sheets

DRIVE UNIT

BACKGROUND AND SUMMARY OF THE INVENTION

This application claims the priority of German Application No. 102004037584.4, filed Aug. 3, 2004, the disclosure of which is expressly incorporated by reference herein.

The invention relates to a drive unit having an electric synchronous machine (particularly, a crankshaft starter generator of a motor vehicle constructed as a synchronous machine), a pulse counter unit for detecting the rotor position during the running operation of the synchronous machine, and a control unit for controlling the synchronous machine.

"Synchronous machines" in the sense of the invention are all electrical machines which, on the basis of their magnetic asymmetry of the rotor, with respect to the stator, have torques generated when the stator winding is excited and, as a result, have a rotational rotor speed synchronous to the stator frequency at least in partial operating ranges. These are in particular: permanent-magnet-excited synchronous motors, electrically excited synchronous motors, reluctance motors, claw pole motors and so-called mixed motors, as well as corresponding generator types which within themselves at least partially combine the above-mentioned motor principles—for example, can assume a mixed form also with the asynchronous machine principle.

In the case of hybrid motor vehicles, synchronous machines of an asynchronous construction (such as short-circuit rotors) and of a synchronous construction are used. In this case, the asynchronous motors are distinguished by the fact that the field of the rotor is impressed by the magnetizing current originating from the stator, and the magnetic orientation of the rotor therefore does not have to be determined by sensors. In the case of synchronous motors, a magnetic asymmetry of the rotor is defined as a result of the construction.

It therefore becomes necessary to know the rotor position of a synchronous motor when the operation of the latter is started. Systems can, for example, be used for this purpose in the case of which the precise rotor position is determined by way of sensor-type absolute-value position generators (such as so-called resolvers or Hall generators with a sine-cosine analysis). However, on the one hand, such sensor systems are very cost-intensive and, on the other hand, require considerable space. Methods are also known which have a so-called sensorless position detection, in which, for identifying the rotor position, the effect of the magnetic asymmetry of the rotor is measured by way of the resulting electrical effect in the stator windings. For identifying the rotor position, both methods require a stationary motor when the operation of the synchronous motor is started. The identification of the rotor position in the case of a stationary rotor is in this case obtained from the applications of industrially used drives, in which the rotor shaft is rigidly connected with the actuators of the application (for example, robot systems).

It is an object of the invention to create a drive unit with a synchronous machine which, by the use of simple devices, ensures a start of the operation of the synchronous machine which is defined at all times.

According to the invention, this object is achieved by providing a drive unit including a synchronous machine, a pulse counter unit for detecting the rotor position during the running operation of the synchronous machine, and a control unit which is constructed such that, with the start of the operation of the synchronous machine, the stator winding of the synchronous machine is energized such that the rotor aligns itself corresponding to a magnetic preference direction parallel to the direction of the magnetic stator field generated by the energizing. In addition, the pulse counter unit is set to a defined starting value.

A defined rotor position is achieved by the targeted energizing of the stator, by which the rotor is caused to align itself corresponding to a magnetic preference direction. In order to be able to determine the rotor position of the synchronous machine in the subsequent operation of the synchronous machine, the pulse counter unit (which shows the angle between the rotor and stator by increments) is set to a defined starting value. In this case, it is a prerequisite that the incremental generator (pulse counter) indicates at least the magnetic periodicity of the electrical synchronous machine. Starting from this defined rotor position, the operation (supply of the stator windings with operating current for generating a magnetic rotating field for the continuous rotor drive) of the synchronous machine can be ensured with a continuously uniform starting behavior. In this case, the magnetic preference direction of the rotor is the direction in which it is aligned such that an energetic minimum is obtained for the superimposition of the stator field and the rotor field. The energizing of the stator windings for the alignment of the rotor preferably takes place by impressing a direct current or a low-frequency current, the frequency and the amplitude being dimensioned such that, despite its inertia and the exterior torques acting upon it, the rotor is reliably capable of following the impressed rotating field on the basis of the frequency.

In the following, the invention will be described for all types of electrical machines based on the example of a synchronous motor. In a particularly preferred embodiment of the invention, the synchronous motor with the pulse counter and the control unit is only a component of a transmission line for a hybrid motor vehicle. The transmission line also includes an internal-combustion engine and a transmission unit, as well as a clutch by which the power transmission between the internal-combustion engine and the transmission can be interrupted. Preferably, two clutches are present. By use of the first clutch, the power transmission between the output shaft of the internal-combustion engine and one end of the drive shaft of the synchronous motor can be interrupted, and, by use of the second clutch, the power transmission between the other end of the drive shaft of the synchronous motor and the input shaft of the transmission unit can be interrupted. The internal-combustion engine, the synchronous machine and the transmission unit are, therefore, arranged in series behind one another in the transmission line and are, in each case, coupled with one another by way of a clutch arranged between two of the components, respectively.

In an alternative embodiment of the transmission line, the synchronous motor with its drive shaft can also be arranged parallel to the input shaft of the transmission unit and, at its input shaft, by way of an intermediate transmission unit with an integrated clutch, can be coupled only with one drive shaft end into the transmission line. In this case, a power-related uncoupling of the synchronous motor can take place only by the controlling of a clutch.

In a contemplated construction, the at least one clutch (depending on the construction—synchronous motor arranged in series or parallel in the transmission line), is controlled by way of the control unit such that the synchronous motor is switched virtually load-free when the operation of the synchronous motor is started. Subsequently, the stator windings of the synchronous motor are energized such that the rotor aligns itself corresponding to a magnetic preference direction. Furthermore, the existing pulse counter unit is set to a defined starting value (for example, starting value=0). Preferably, the setting of the starting value of the pulse counter unit takes place at a point in time at which the rotor of the synchronous motor is already aligned according to its magnetic preference position. Based on this defined starting position, the rotor position determination during the operation of the synchronous motor takes place by the pulse counting of the pulse counter unit.

Other objects, advantages and novel features of the present invention will become apparent from the following detailed description of the invention when considered in conjunction with the accompanying drawings.

DETAILED DESCRIPTION OF THE DRAWINGS

Figure 1A:
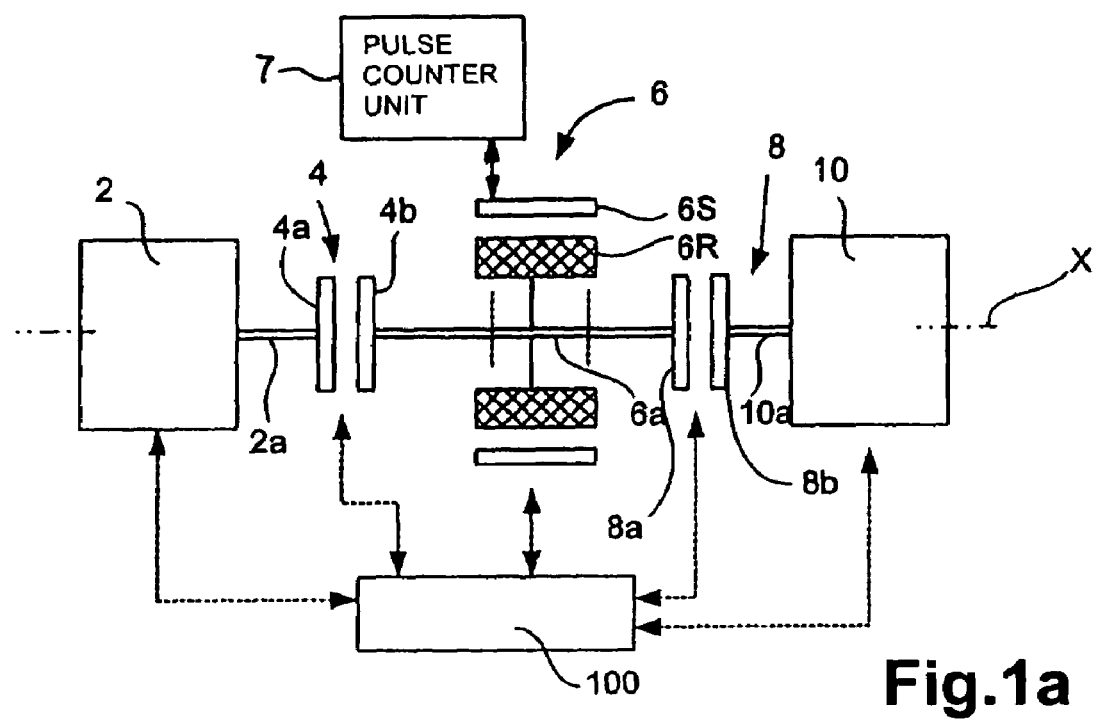
FIGS. 1a, 1b are schematic representations of the transmission line of a hybrid motor vehicle including a drive unit according to the invention.

FIG. 1a shows a preferred embodiment of the invention, in which the drive unit according to the invention is integrated in the transmission line of a hybrid vehicle. The transmission line includes an internal-combustion engine 2 with an output shaft 2a, a clutch 4, which is connected by way of a first clutch part 4a with the output shaft 2a, and which is connected with a second clutch part 4b with the drive shaft 6a of a synchronous motor 6. The synchronous motor 6 (stator 6S, rotor 6R) is connected by way of the other end of its drive shaft 6a with a first clutch part 8a of a second clutch 8. By way of the second clutch part 8b of the second clutch 8, the synchronous motor 6 is connected with the input shaft 10a of a trasmission unit 10. A pulse counter unit 7 may detect a rotor position during a running operation of the synchronous motor 6.

Figure 1B:
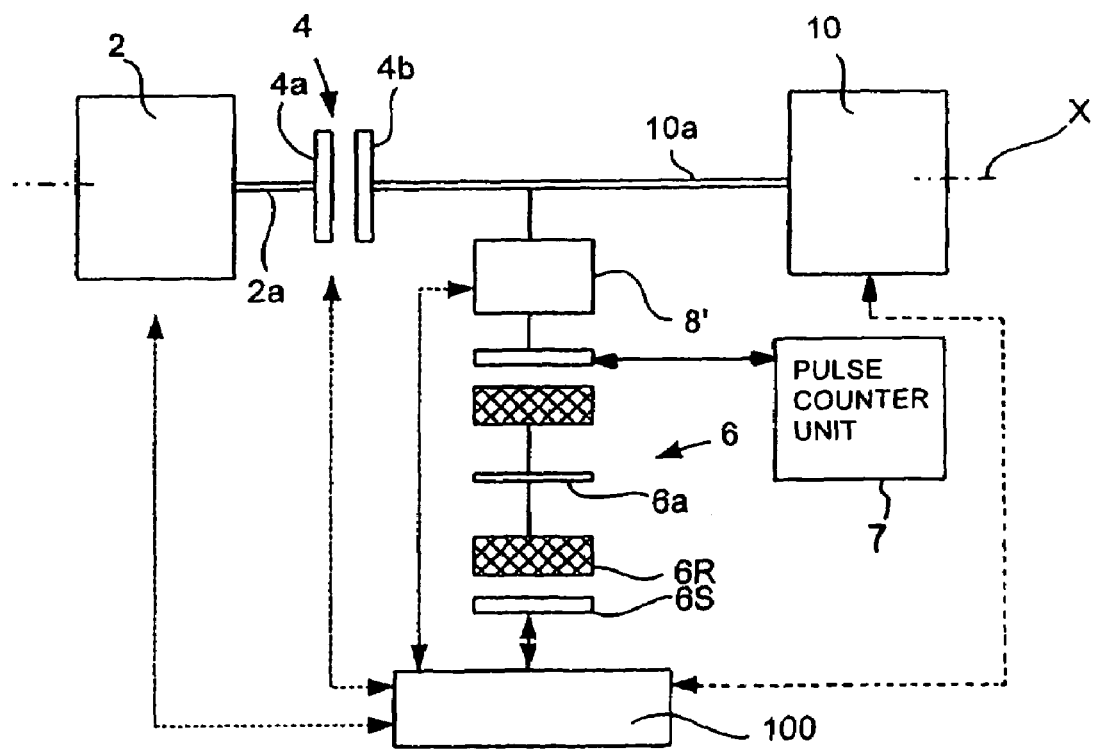

FIG. 1b illustrates a second possible construction of a transmission line for a hybrid motor vehicle, in which the drive unit according to the invention is arranged with the rotor shaft 6a of the synchronous motor 6 parallel to the transmission input shaft 10a, and can be coupled by way of only one clutch 8' into the transmission line with respect to power.

The coordination of the individual assemblies of the transmission line takes place by one superimposed and/or several equipment-specific control units. For reasons of clarity, only a single superimposed control unit 100 is shown here, which also represents other control unit combinations.

Figure 2:
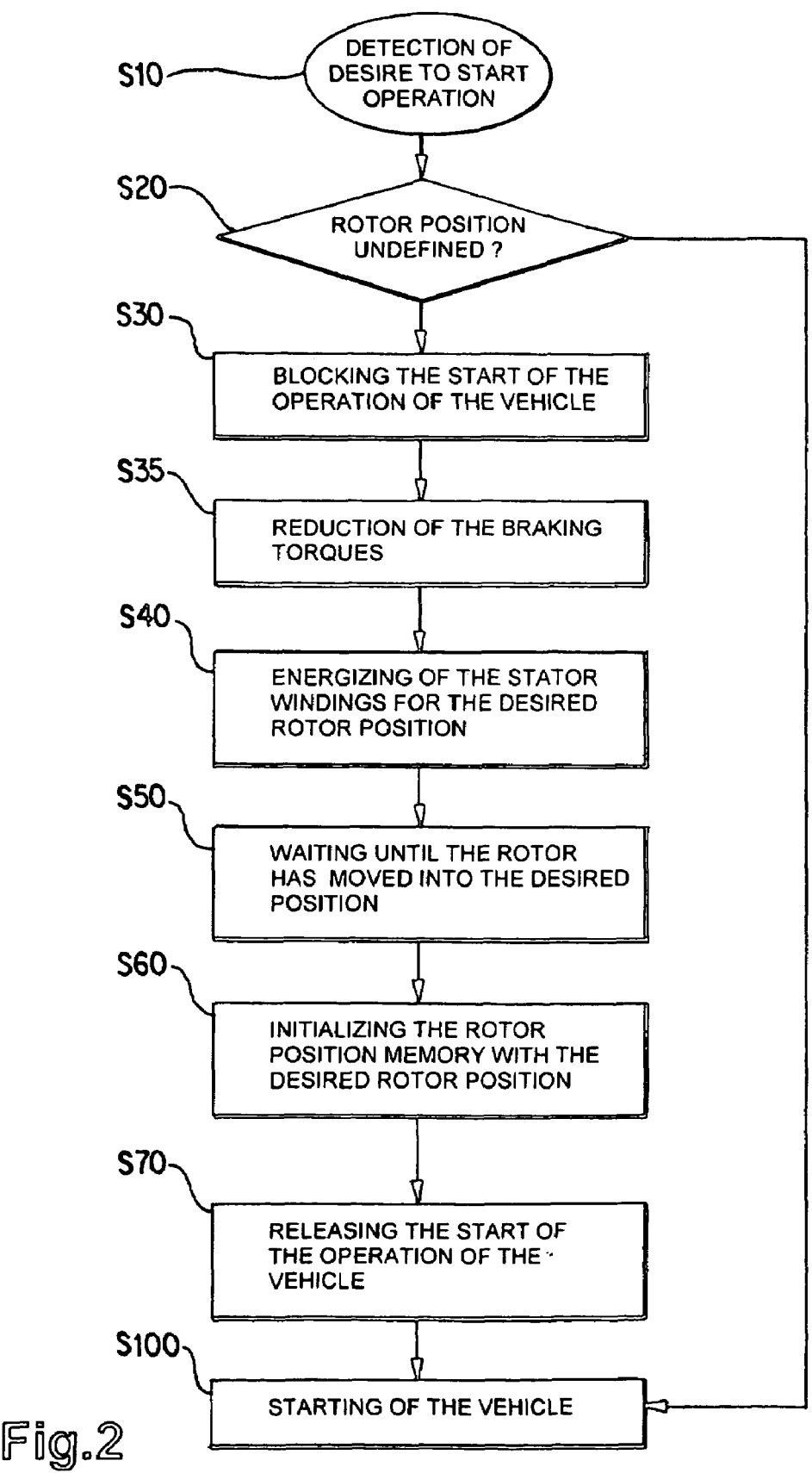
FIG. 2 is a flow chart for illustrating the method of operation of the drive unit according to the invention.

According to FIG. 2, the method of operation of the drive unit according to the invention defined by the control unit 100 is illustrated in the preferred embodiment according to FIGS. 1a, 1b by means of a flow chart. In a first step S10, a desire to start the operation of the hybrid motor vehicle, for example, by the insertion of an ignition key, is detected. Subsequently, it is queried in the second step S20 whether a defined rotor position of the synchronous motor 6 exists. This query takes place, for example, in that a memory is read out into which, from the preceding operating cycle, the actual rotor position had been stored at the end of the operation. If a defined rotor position already exists, a branching-off to the last step S100 can take place for the starting of the vehicle. If no defined rotor position exists, the start of the operation of the vehicle is blocked in a subsequent step S30 in that, for example, the ignition circuit is interrupted.

The reduction of the braking and dragging torques acting upon the rotor shaft follows in a step S35. On the one hand, the torque reduction may take place by a complete decoupling of the assemblies operatively connected by way of individual clutches with the synchronous motor. On the other hand, torque reduction may also be achieved in that the coupled-on assemblies are at least partially reduced by a targeted controlling in their torques having a braking effect on the rotor shaft (for example, by opening individual or all charge cycle valves of the coupled internal-combustion engine). A mixed form of the torque reduction may also be achieved in which some assemblies are uncoupled by the opening of clutches and other assemblies generate fewer braking torques as a result of the targeted controlling. Subsequently, in Step S40, the energizing of the stator windings takes place, which causes the rotor to move into a desired rotor position (magnetic preference direction). After a waiting time in Step S50, within which the rotor has moved into its desired position, the desired rotor position, which now corresponds to the actual rotor position, is stored in a memory (Step S60). Finally, in Step S70, the start of the operation of the vehicle is released (the lock of Step S30 is canceled) and the synchronous motor 6 or the vehicle is started (Stop S100).

In an alternative to the preferred embodiment, in which the drive unit according to the invention is integrated in the transmission line of a hybrid vehicle, the method of operation of the drive unit according to the invention having the synchronous motor, the pulse counter unit and control unit is as follows:

After a starting signal (S10) for starting the synchronous motor 6, it is queried whether the rotor position is undefined or defined (S20). When the rotor position is not defined, a drive energizing for generating a rotating field for the drive of the rotor, which is to follow the rotating field in a continuous rotating movement, is suppressed (S30); a reduction of the torques having a braking effect on the rotor shaft is carried out (S35); and an energizing of the stator windings is initiated (S40)) such that the rotor moves into a defined magnetic preference position. Only after the rotor has reached its desired position, which can be ensured, for example, by a fixed correspondingly long waiting time (S50), will the desired rotor position (=actual rotor position) be stored in a memory (indicated, for example, be setting a flag) (S60), and the drive energizing takes place for generating a rotating field (S70, S100), so that the synchronous motor 6 can be started in an always identically repeatable manner with respect to its starting behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive unit, comprising:
    a synchronous machine;
    a pulse counter unit for detecting a rotor position during a running operation of the synchronous machine; and
    a control unit configured, to control energizing of a stator winding of the synchronous machine during an operional start of the synchronous machine, such that the rotor aligns itself corresponding to a magnetic preference direction parallel to a direction of a magnetic stator field generated by the energized stator winding, the magnetic preference direction of the rotor having an energetic minimum for the superimposition of the stator field and the rotor field; and wherein, the pulse counter unit is set to a defined starting value.

2. The drive unit according to claim 1, wherein the energizing of the stator winding occurs by one of impressing a direct current and impressing a rotary current, having a frequency dimensioned such that, despite the rotor inertia, the rotor can follow a resulting alternating field of the stator.

3. The drive unit according to claim 2, wherein the control unit is further configured such that a reduction of braking torque acting upon a drive shaft of the synchronous machine takes place by opening a clutch by which the synchronous machine is coupleable to an input shaft of a transmission unit of a motor vehicle.

4. The drive unit according to claim 1, wherein the control unit is further configured such that a reduction of braking torque acting upon a drive shaft of the synchronous machine takes place by opening a clutch by which the synchronous machine is coupleable to an input shaft of a transmission unit of a motor vehicle.

5. The drive unit according to claim 4, wherein the control unit is further configured such that a reduction of a braking torque takes place by a targeted controlling for torque reduction of assemblies operatively coupled with the rotor and acting upon the rotor in a braking manner.

6. The drive unit according to claim 5, wherein the targeted controlling includes an opening charge cycle valves of an internal combustion engine coupled with the synchronous machine.

7. The drive unit according to claim 1, wherein the control unit is further configured such that the reduction of the braking torque additionally takes place by a targeted controlling for torque reduction of assemblies operatively coupled with the rotor and acting upon the rotor in a braking manner.

8. The drive unit according to claim 7, wherein the targeted controlling includes an opening of charge cycle valves of an internal combustion engine coupled with the synchronous machine.

9. The drive unit according to claim 1, further comprising:

an internal-combustion engine and a transmission unit;

wherein the synchronous machine is coupled by way of one end of its drive shaft via a first clutch with the internal-combustion and, by way of another end of its drive shaft via a second clutch with the transmission unit; and wherein the control unit is configured such that a reduction of a braking torque applied to the drive shaft of the synchronous machine is permitted by an opening of at least one of the first and second clutch or by a controlling of assemblies coupled with the drive shaft of the synchronous machine for reducing a braking torque applied to the drive shaft.

\* \* \* \* \*